United States Patent [19]

Chen

[11] 4,336,855
[45] Jun. 29, 1982

[54] AUTOMATIC DIGIT DISPLAY MACHINE FOR MEASURING HEIGHT AND WEIGHT

[76] Inventor: Li-Fu Chen, 2nd Fl., No. 2, Alley 5, La. 57, Fu-Ho Rd., Yuan-Ho City, Taiwan

[21] Appl. No.: 154,038

[22] Filed: May 28, 1980

[51] Int. Cl.³ .......................................... G01G 23/00
[52] U.S. Cl. .................................................... 177/245
[58] Field of Search ......................................... 177/245

[56] References Cited

U.S. PATENT DOCUMENTS 3,616,690 11/1971 Harden ........................... 177/245 X

FOREIGN PATENT DOCUMENTS 55-12485 1/1980 Japan .................................... 177/245

Primary Examiner—George H. Miller, Jr.
Attorney, Agent, or Firm—Cushman, Darby & Cushman

[57] ABSTRACT

The present invention offers an "automatic digit display machine for measuring height and weight" which can measure the height and weight of human body at the same time by virtue of an illuminant (LED or bulb) on the top of the machine to slopewise emit a ray downward illuminating the human head. The ray reflects to a plane mirror which, in turn, further reflects it to a sensor (CDS or photo-electric crystal) so as to stop the impetus of flexible transmission. Meantime, the metal contact sliding upward stops at the certain position of circuit board, and thru the special circuit design of the circuit board, the digit of height of human body is displayed by the drive circuit display device.

The weight of human body is displayed with digit by the said display device thru the said drive circuit in line with the micromotion generated by the weight-measuring result from the high-class scale body in general.

9 Claims, 6 Drawing Figures

4,336,855

AUTOMATIC DIGIT DISPLAY MACHINE FOR MEASURING HEIGHT AND WEIGHT

BACKGROUND OF THE INVENTION

This invention relates generally to the measurement of human body weight and height. However, the conventional height and weight measuring machines remain independent of and separate from each other, particularly no breakthrough is achieved in the field of height measurement: without assistance from others, no one can measure out his own height. Such a troublesome height measurement is really waste of time, inconvenient and uneconomical.

SUMMARY OF THE INVENTION

In view of the above-said drawbacks of conventional height and weight measuring machines, the perfect "automatic digit display machines for measuring height or weight" of the present invention is designed to measure the height and weight of human body at the same time and the precise digits indicating the result of measurement are displayed on the character screen.

DESCRIPTION OF THE PREFERRED EMBODIMENT

A preferred embodiment of the present invention will be described in detail with reference to the drawings.

Figure 1:
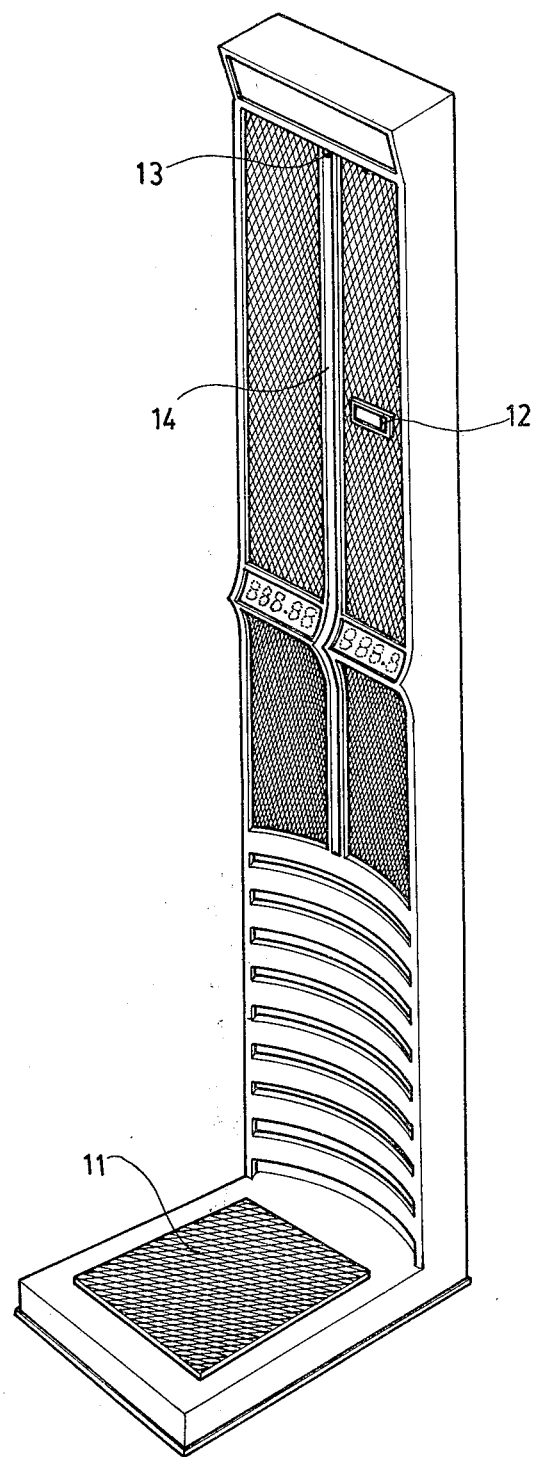
FIG. 1 is a perspective view of one embodiment of the present invention.
Figure 2:
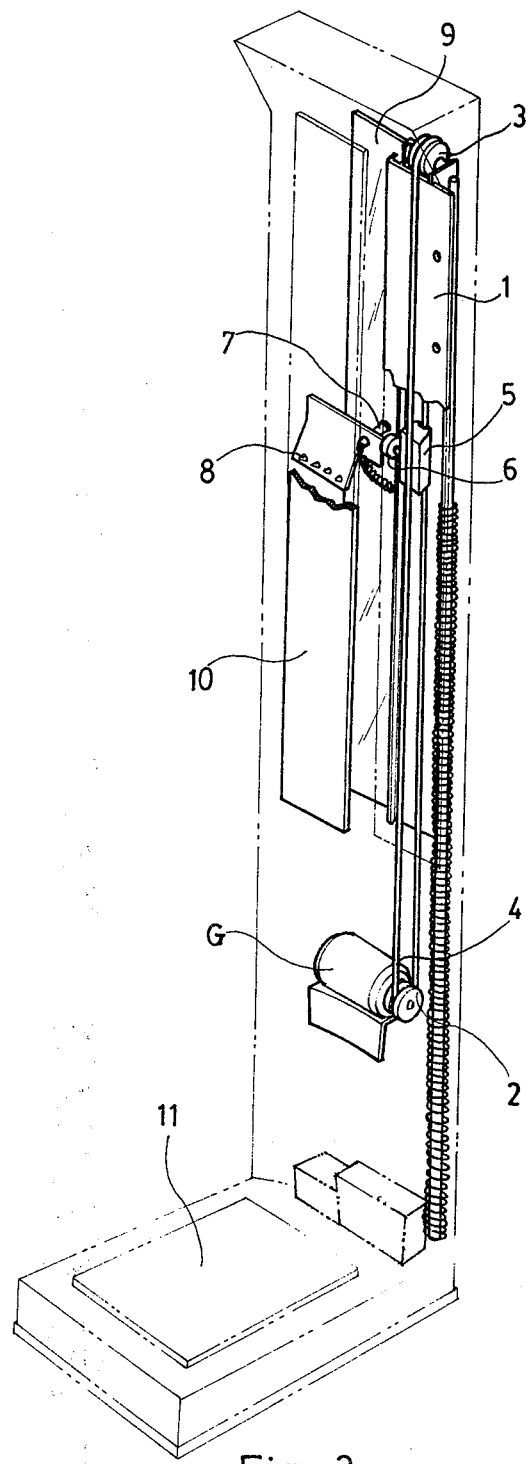
FIG. 2 is an elevation view of height measuring mechanism of the present invention.
Figure 4:
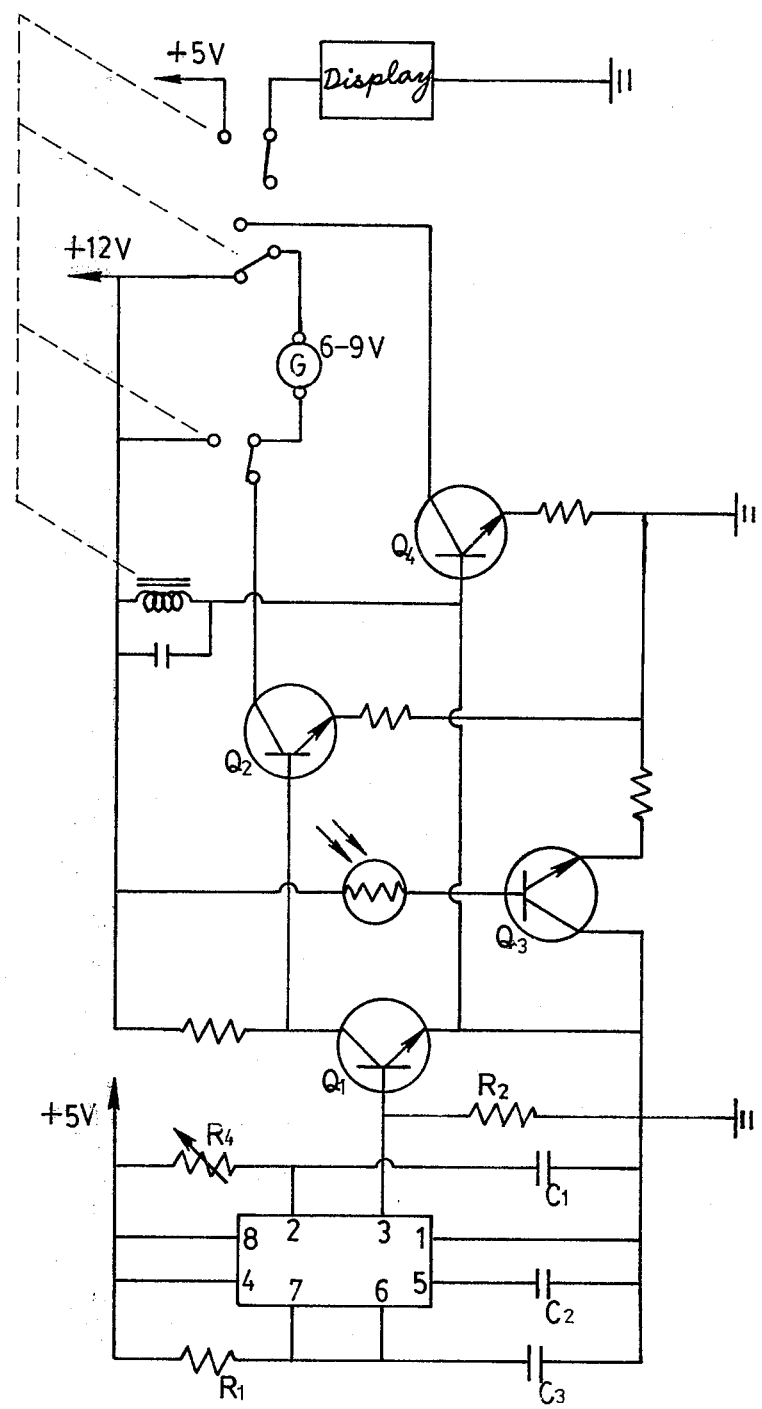
FIG. 4 is a control circuit diagram of one example of the present invention.

As shown the FIG. 4 schematic diagram, the negative terminal of motor G is connected to the lower contact of collector of $Q_4$, relay contact of first set, and the positive terminal thereof is connected to the lower contact of second set. When it is turned on, the relay is inactive because the transistor $Q_3$ is not active. However, the coil of the relay provides a positive potential to the base of transistor $Q_4$ which causes it to become active which in turn causes motor G to begin rotation. As shown in FIG. 2, a motor G is below the dove track (1). A transmission rope is wound on a driving belt roller (2) mounted to the rotating shaft of motor G and on the driven belt roller (3) above the dove track (1) respectively to form a flexible transmission. One side of transmission rope (4) is fixed to a sliding block (5) in the dove track (1) and another side thereof is outside the dove track (1). A roller bearing (6) is set beside the said sliding block (5) so that the the sliding block (5) can slide more easily. A sensor (7) and four metal contacts (8) are set on the extended shaft of roller bearing (6). The sensor (7) exactly faces a rectangular plane mirror (9), and the four metal contacts (8) are opposite to the sensor (7) and contact a sliding circuit board (10). Before operation of the present invention, the sliding block (5), sensor (7) and metal contacts are in the lowest position. When somebody stands on the scale platform (11) (as shown in FIG. 1) and casts a coin into the coin inlet, the machine is turned on, the illuminate (13) on the top of said machine emits the ray in a preset dip to illuminate his head and the ray reflects to the plane mirror (9) thru the slot way (14). Since the ray-emitting angle is outward, so far as the ray reaching the plane mirror (9) is concerned, only the ray above the top of his head may reflect to the plane mirror (9), the ray below the top of his head is weak. When the machine is turned on, motor G begins to rotate, the sliding block (5) moves upward along the dove track (1) until the said sensor (7) reaches the same level to receive the stronger ray reflecting from the plane mirror (9), i.e. the ray reflecting from the top of his head. When the ray is reflected and received $Q_3$ on the circuit under a base bias switches causing $Q_4$ to turn off which causes the said relay to move thereby contacting the upper contact. The off state of $Q_4$ causes motor G to stop rotating; meantime, metal contacts (8) stop in a position on the sliding circuit board (10), and the drive circuit and display device contacted by the metal contacts (8) can display the correct digit indication corresponding to the stopped position.

When the digit is shown, motor G does not rotate, the relay remains at the upper contact, the negative voltage begins to time thru the emitter and collector of $Q_3$ and the action of IC. $R_4$ and $C_1$ are time controls for timing and for adjusting the time length to display the digit as required; when the timing is achieved, $Q_1$ does not act but $Q_2$ acts because $R_5$ gives bias to the base of $Q_2$. Since the upper contact of relay reversely contacts the power source of motor G, the said power source is also reversed, the motor begins reverse rotation, the sliding block (5) moves downward to the lowest position, contacting a microswitch and cutting off the power source which causes motor G to stop rotating, the illuminant to stop illuminating, and all the powered actions to stop and wait for the next measuring operation.

Figure 3:
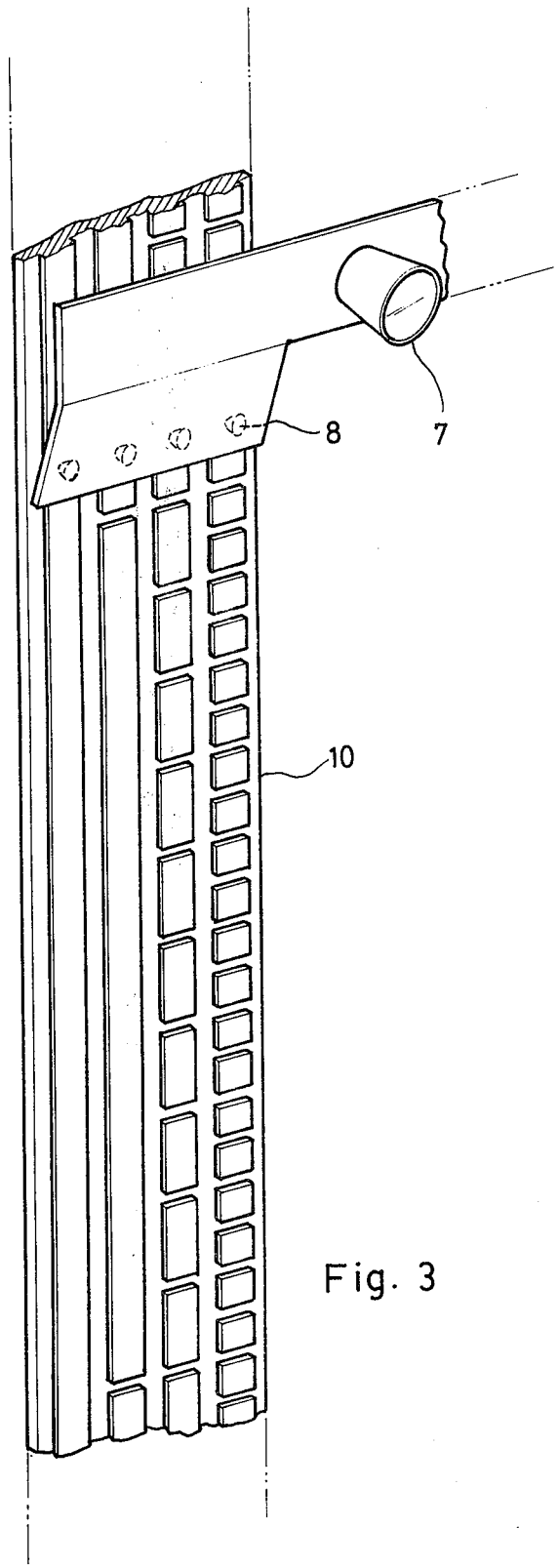
FIG. 3 shows one example of sliding circuit board of the present invention.

The sliding circuit board (10) may be made of PCB or lamination or plating plastic sheet and specially designed (as shown in FIG. 3) into 4 or 5 routes, the last route may be designed in line with the precision of the present invention. For instance, 5 mm or 2 mm or 0.1" per scale, the next route may be 50 mm or 6" per scale, the first route may be 1 m or 1 foot per scale. In otherwords, the sliding circuit board (10) of the present invention may be designed into 4 or 5 or even 6 routes in line with precision required, and also may be given English or metic system measurement in line with the requirement in reality.

Figure 5:
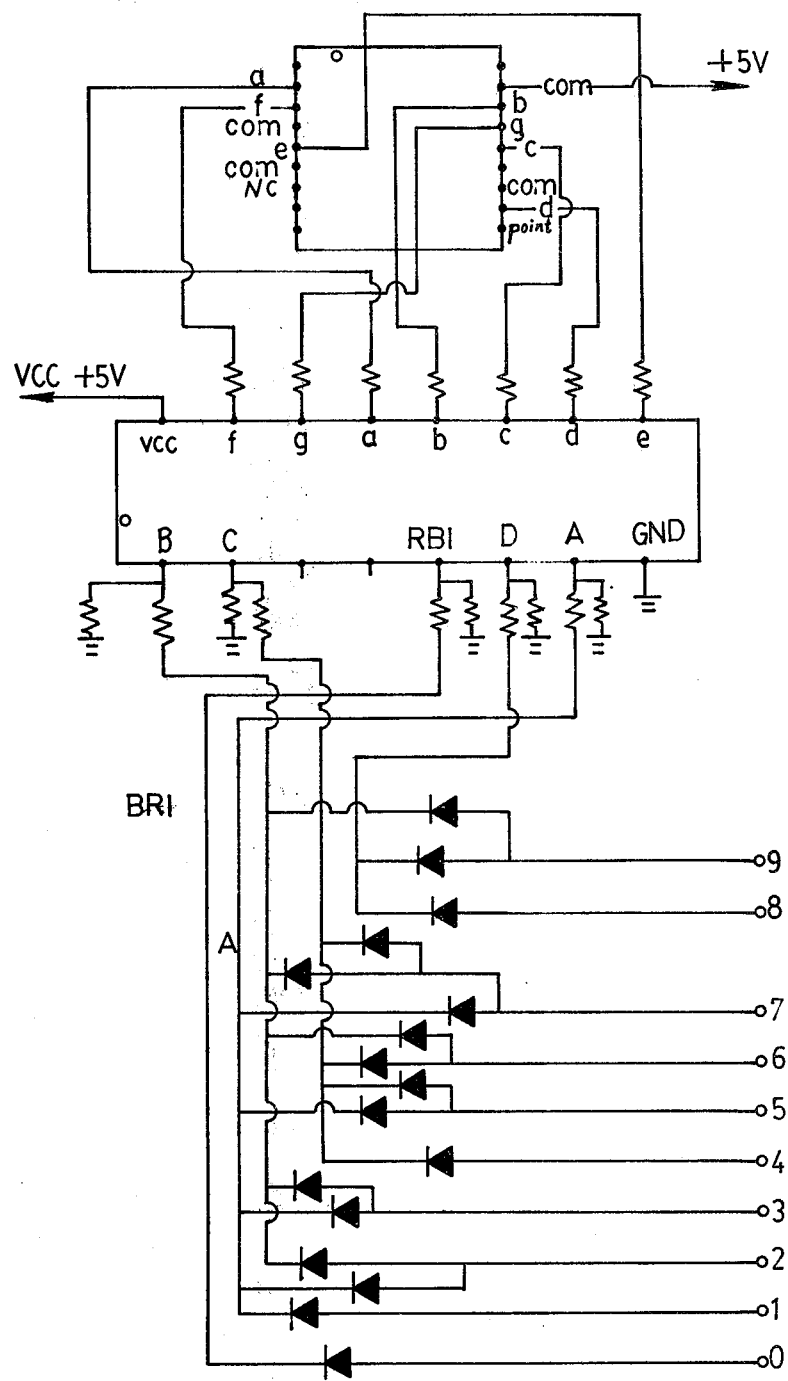
FIG. 5 is a height display circuit diagram of one example of the present invention.
Figure 6:
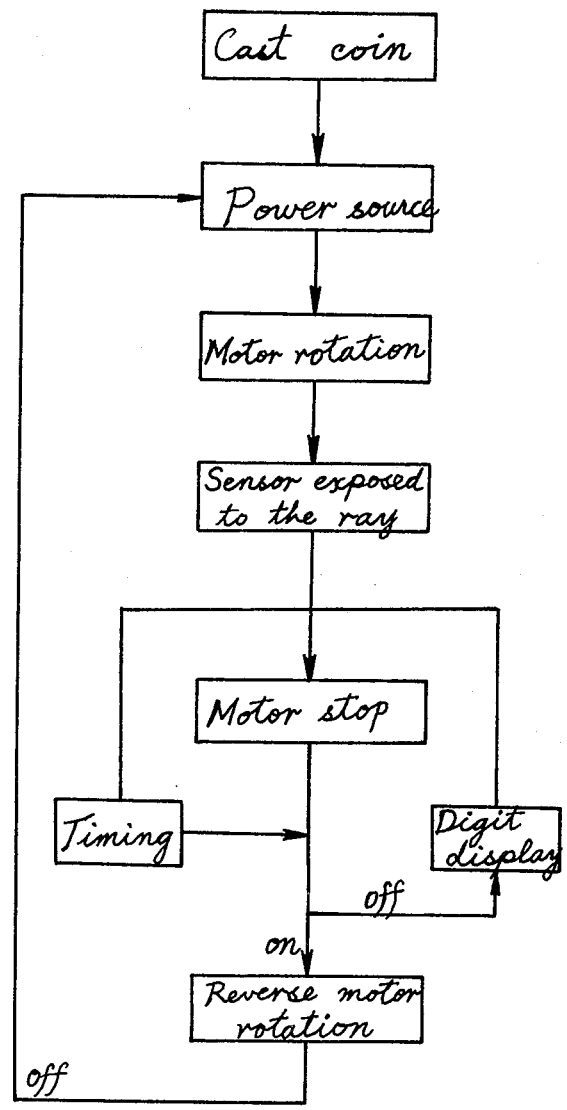
FIG. 6 is a flow chart of height measuring portion of the present invention.

The said sliding circuit board (10) continuously displays different digits when contacting the metal contact (8) in the course of sliding. As shown in FIG. 5, these digits are indicated by two integrated circuits: IC-FND807 and IC-SN744 of which the output covers 0, 1, 2, 4 and 8, and others such as 3, 5, 7, and 9 comprising 2 or 4 digits. Therefore, the present invention has to adopt the 3P-relay wherein two sets are for motor and the 3th set is for display device.

The beam of illuminant (13) on the top of said machine of the present invention illuminates the human head downward in a dip. Therefore, the ray reflecting from the said head may illuminate the plane mirror (9) but the rest of the ray cannot reflect to the plane mirror (9). When the present invention is in a state of flexible transmission, since a microswitch is installed at the highest and lowest sliding positions of the sliding block (5) respectively, so the sliding block (5) may automatically cut off the power source to make the motor G inactive when said sliding block (5) reaches these two extremes. When the illuminant is out of order to cause the continuous rotation of motor G and the sliding block (5) moves to the said highest position, the microswitch may cut off the power source so as to prevent motor G from being damaged by rotating for too long a period of time.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

We claim:

1. An apparatus for measuring and displaying the height and weight of a human being, comprising:
   a platform;
   means for measuring the weight of a human being standing on the platform;
   a light source for illuminating the head of a human being standing on the platform with a beam of light;
   a mirror for receiving light reflected from the head and further reflecting the received light;
   a movable sensor system responsive to light reflected from the mirror;
   means for (a) moving the sensor system from a first lower position in a generally upward direction and (b) stopping the motion of the sensor system responsive to light reflected thereto from the mirror;
   means for determining the position of the stopped sensor system and interpreting this position as a corresponding height of the human being on the platform; and
   means for simultaneously displaying the measured weight and height.

2. An apparatus according to claim 1 further including means for returning the movable sensor system to the first position after a predetermined period of time following the display of height and weight.

3. An apparatus according to claim 1 wherein the light source is infrared and wherein the sensor system includes an infrared sensor.

4. An apparatus according to claim 1 wherein the light sensor system includes a CdS cell.

5. An apparatus according to claim 1 wherein the light sensor sytem includes a photo-electric crystal.

6. An apparatus according to claim 1 wherein the light source is a light-emitting diode (LED).

7. An apparatus according to claim 1 wherein the light sensor system comprises:
   a generally vertical track;
   a block slidable in the track and having contacts thereon;
   a circuit board having contacts thereon;
   a motor and transmission for moving the block within the track, the contacts of the block making electrical contact with different contacts of the circuit board as the block moves within the track, the particular contacts of the circuit board being contacted indicating the position of the block.

8. An apparatus according to claim 7 wherein the transmission comprises:
   a driving belt roller attached to a shaft of the motor;
   a second belt roller on the track, and
   a transmission rope looped about the driving belt roller, the second belt roller and coupled to the block.

9. An apparatus according to claim 7
   wherein the circuit board includes electronic means for determining a height signal for driving a digital display as a function of the particular contacts of the circuit board that are electrically contacted by the contacts of the slidable block; and
   wherein the means for displaying comprises a digital display.

* * * * *